May 31, 1960
G. E. HENRY
2,938,669
QUALITY CONTROL DEVICE
Filed July 6, 1953
2 Sheets-Sheet 1
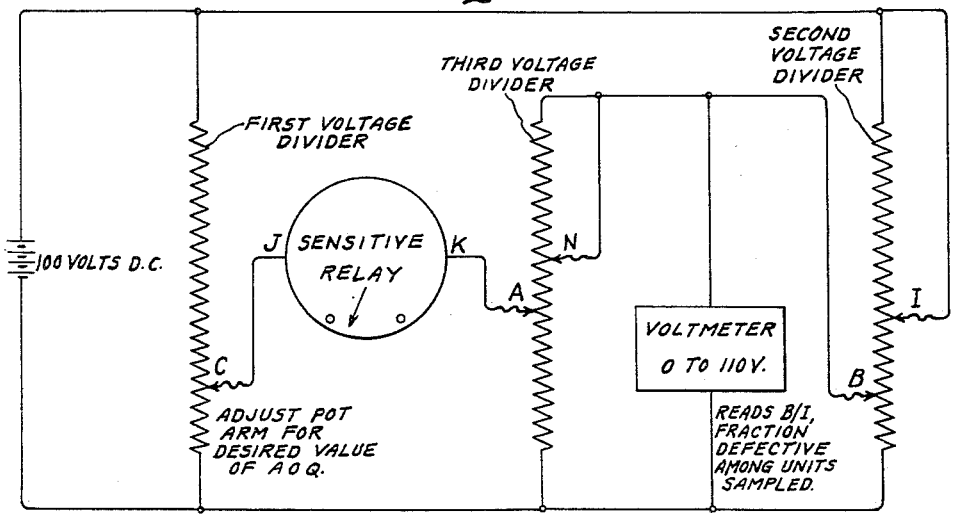
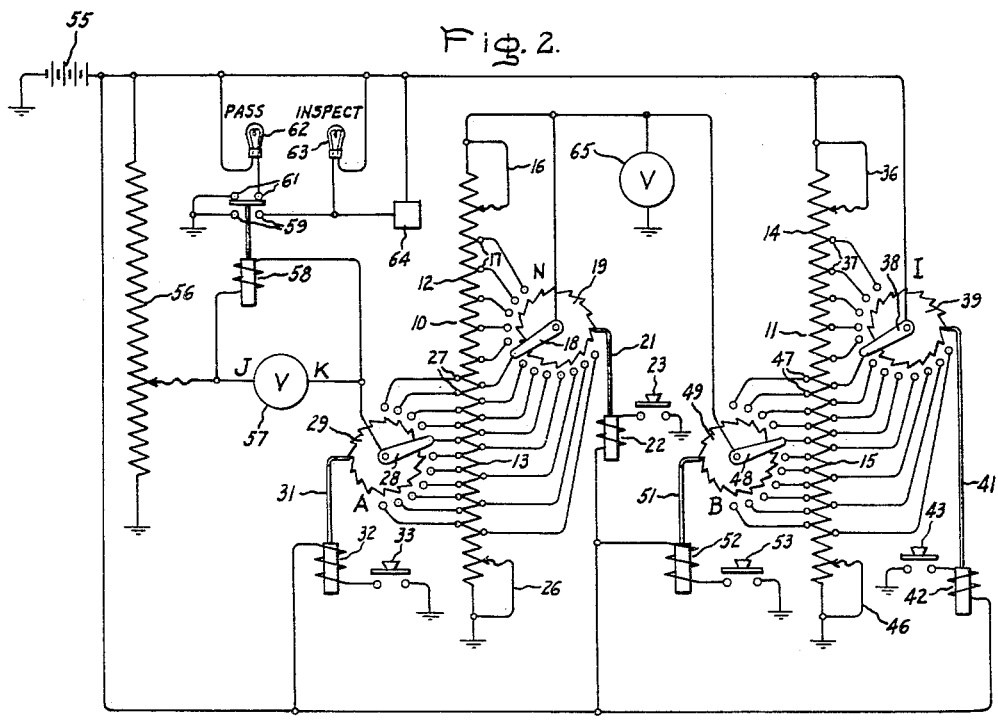
Inventor:
George E. Henry,
by Paul A. Frank
His Attorney.

United States Patent Office 2,938,669
Patented May 31, 1960

2,938,669

QUALITY CONTROL DEVICE

George E. Henry, Schenectady, N.Y., assignor to General Electric Company, a corporation of New York Filed July 6, 1953, Ser. No. 366,273

4 Claims. (Cl. 235—179)

This invention relates to a quality control device. More particularly, it relates to a continuous sampling plan, and to the mechanism for administering this plan. Like all other plans for continuous sampling inspection by attributes, the present plan provides that not all units be inspected for defects but only particular units intended to be representative of the entire number of units.

In the manufacture of many articles, the time and expense involved in inspecting each and every outgoing item in order to eliminate substantially all sub-quality units is unwarranted commercially. A small percentage of sub-quality units may often be tolerated and a proper procedure of sampling inspection rather than total inspection is employed to insure that the tolerable percentage of defective units will not be exceeded. This tolerable percentage of defective units can be expressed statistically in several different ways, as by the A.Q.L. (acceptable quality level) or the A.O.Q.L. (average outgoing quality limit). The "average outgoing quality limit" of a production line may be generally defined as the highest percent of sub-quality or defective units which can exist in the total long term output of a production line having a certain quality control inspection system. More technically, the A.O.Q.L. is the maximum value of the average outgoing quality (A.O.Q.) which is the long-term average outgoing percent defective for a given incoming percent defective. The sampling inspection procedures necessary to maintain the statistical significance of the above levels or limits are somewhat complicated with the result that many manufacturing concerns utilize an unwarranted total inspection procedure or employ a completely haphazard inspection procedure.

Accordingly, it is an object of this invention to provide apparatus which makes all calculations necessary to determine whether a particular unit shall be inspected and which merely indicates to an inspector whether he should inspect the unit or pass (accept) it without inspection. After the apparatus has made the decision that a certain unit is to be inspected, and signaled that decision to the inspector, it is then up to the inspector to decide whether this particular unit passes or fails.

Another object of the invention is to provide an apparatus which will continuously indicate the fraction found defective in the sample which has been inspected.

A further object of the invention is to provide an apparatus which will enable the inspector to perform sampling inspection at a continuously varying sampling rate as determined by the observed fraction defective.

In any continuous sampling inspection procedure, the objective is to perform a large amount of inspection when the incoming quality is poor (to insure that many or most of the sub-quality items are found and discarded), and to perform only a small amount of inspection when incoming quality is good (in order to economize on the time spent in inspecting). Statistically designed plans for accomplishing this objective are available: The Wald and Wolfowitz plan (described in "Annals of Mathematical Statistics," XVI, 1, March 1945, pages 30–49); also the Dodge plan (described in "Annals of Mathematical Statistics," XIV, 3, September 1943, pages 264–279).

Both the above plans accomplish this objective by intermingling total inspection and sampling inspection, according to certain criteria which are related to the incoming quality.

The plan upon which the present invention is based accomplishes the objective in a different way, by continuously varying the sampling rate in accordance with the observed fraction defective.

Inspection plans which require an inspector to count the units being produced and inspect certain ones of them suffer from the drawback that many inspectors do not appreciate the importance of following the plan exactly. Therefore, it is a further object of this invention to provide an apparatus which indicates to the inspector which units he is to inspect. The present apparatus reduces sharply the temptation on the part of the inspector to cheat since he cannot predict what effect his pass-or-fail verdict on a particular unit will have on the next decision of a computer and because, moreover, the rejection of a single unit will not force a long sequence of inspections but will rather alter slightly the going rate of sampling.

Briefly stated, in accordance with one of its aspects, this invention is directed to a quality control device comprising an electrically balanced bridge circuit including a first, second and third voltage divider, means for varying the voltage output of the first voltage divider in accordance with the desired value of A.O.Q., means for varying the voltage output of the second voltage divider in accordance with the ratio of the number of units found defective to the number of units inspected, means for varying the voltage output of the third voltage divider in accordance with the ratio of the number of units accepted without inspection to the total number of units, good or bad, to have passed the inspection station, and means responsive to the voltage divider settings for indicating when a unit is to be inspected.

In the operation of the device of this invention, several electrical contactors are used to establish resistance values corresponding to quantities such as the total number of units produced, total number of units passed without inspection, number of units inspected, and number of units found defective. The following formulas represent the mathematical expression of these various relationships:

Let $N$=total number of units produced up to the time in question
$A$=number of units passed without inspection
$I$=number of units inspected
$B$=number of units found defective
$AOQ$=average outgoing quality Then $I+A=N$
$I/N=f$=fraction sampled
$B/I=p$=fraction defective in sample
$P$=fraction defective in process as a whole and is equal to $p$ on the assumption that the fraction of those inspected and found defective holds for the whole group
$(1-f)p=AOQ$ if all defectives found are replaced with known good units Let $$C=AOQ=(1-f)p=(A/N)(B/I) \quad (1)$$

Fig. 1 is a schematic diagram of an electrical circuit which answers to Equation 1 above.

Fig. 2 is a schematic diagram in which the several components of the above circuit are more fully represented.

Figure 3:
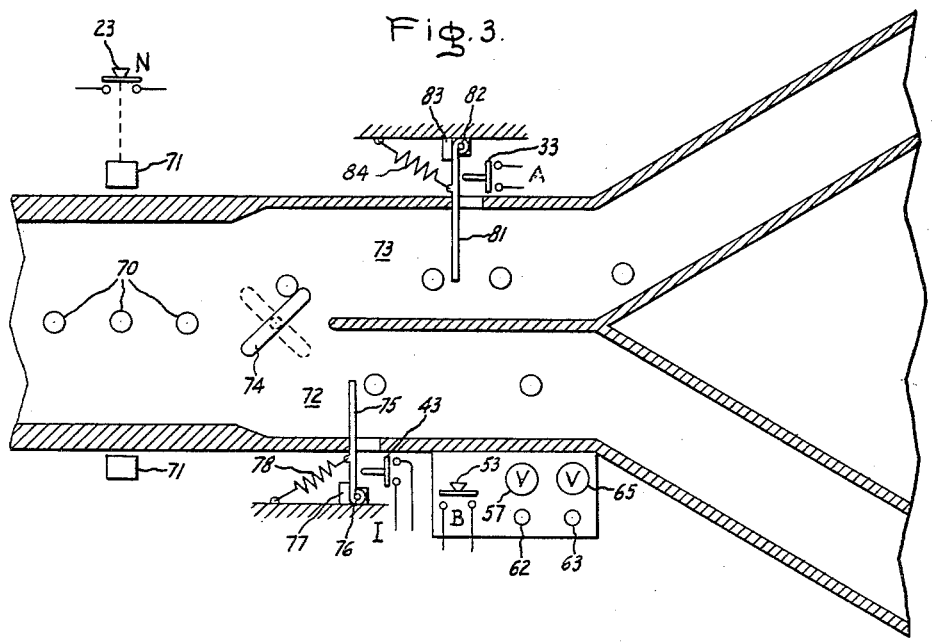
Fig. 3 is a partially schematic and partially sectional plan view illustrating an assembly line equipped with the apparatus of Fig. 2.

The electrical circuit which answers to the above equations is shown in Fig. 1. In view of the very schematic form of Fig. 1, the description of its operation is more easily understood by labeling the elements with the descriptive names rather than numerical subscripts. The letters shown near the various voltage dividers conform to the equations set forth above.

The first voltage divider, which is desirably of about 10,000 ohms resistance, has its potentiometer arm set for the desired value of AOQ. The second voltage divider, which is desirably of a total resistance of about 500 ohms, represents the quantity $B/I$. The third voltage divider, which is desirably of a total resistance of about 10,000 ohms, represents the quantity $A/N$. The circuit interconnecting the second and third voltage dividers in effect multiplies $B/I$ by $A/N$. If the product of this multiplication is greater than C in accordance with the setting of the first voltage divider, the sensitive relay closes one set of contacts (not shown in Fig. 1) to signal "inspect." If the product $A/NB/I$ is less than C the sensitive relay closes another set of contacts (not shown in Fig. 1) to signal "pass without inspection."

An inspection of the circuit illustrated in Figure 1 discloses that the bridge circuit described above is formed by connecting the upper terminals of the first and second voltage dividers together and providing a common connection between the lower terminals of each of the three voltage dividers. Energization for the bridge circuit is provided by means of a voltage source, such as a 100 volt battery, connected between the input terminals.

In Fig. 2, each of a pair of resistors 10 and 11, which constitute the third and second voltage dividers, respectively, of Fig. 1, has a double set of taps through which a circuit may be selectively completed in accordance with the various quantities A, N, B and I. Since the mechanical stepping arrangement is the same for making all of these settings, the description will be limited to the setting of the quantity N, total number of units produced on the right hand side 13, of resistor 10. Corresponding elements on the left hand side 12, of the resistor 10, represent A, the number of units passed without inspection; the right hand side 15 of the resistor 11 represents I, the number of units inspected; and the left hand side 14 of the resistor 11 represents B, the number of units defective. These elements have been assigned identification numbers which are 10, 20, and 30 higher, respectively, than the elements to be described with reference to the right hand side 13 of the resistor 10.

The portion 13 of the resistor 10 has a plurality of taps 17 at regularly spaced intervals along its entire length. The taps 17 are connected to the terminals of a contact bar 18 mounted on a ratchet 19 which is adjusted by a pawl 21 under the influence of a stepping magnet 22 which is actuated by the closing of a push button 23.

A source of energy for operating the various elements of the apparatus is provided by a direct current source 55. Energy from the source 55 passes through a first voltage divider 56 of about 10,000 ohms resistance, the setting of which determines the voltage applied at the point J. The first voltage divider on the one hand, and the second and third on the other, may be considered a bridge circuit which operates the relay 58. Thus, as in Figure 1 the upper terminal of the first voltage divider 56 and the second voltage divider 11 are connected together and to one terminal of a unidirectional voltage supply source 55. The lower terminal of these two voltage dividers and the lower terminal of the third voltage divider 10 are all connected to ground potential and hence to the opposite terminal of the unidirectional voltage source 55.

The imbalance of the bridge for any particular setting which may be read by a galvanometer 57 operates the relay 58 which is of a very sensitive type so that it can close its contacts 61 or its contacts 59 depending upon the direction of the imbalance. Either the galvanometer 57 or the relay 58 may be omitted. If the relay 58 is omitted the inspector refers to the galvanometer, the direction of the deflection of which indicates whether the next unit is to be inspected or passed. If the meter 57 is omitted, a current from left to right through the relay 58 will cause the contacts 61 to close allowing an "omit inspection" lamp 62 to light up. If the current flows from right to left through the relay 58, the contacts 59 will be closed to complete a circuit for operation of a lamp 63 indicating that the next unit should be inspected. An optional automatic control device 64 is shown in block form. This device may be used to shift the next unit produced to an inspection line. For a manual system the control device 64 may be omitted.

Before discussing the operation of the circuit illustrated in Fig. 2 it should be stated that this circuit has been simplified for purposes of illustration. For instance, it is shown with push buttons 23, 33, 43 and 53. While it appears that there are four manually operated push buttons actually only the push button 53 need be manually operated and the others may be automatically operated micro-switches or their associated stepping magnets may have their circuits completed by other automatic means. A comparatively small number of take-off taps have been illustrated for each of the resistors 10 and 11. In actual practice there may be as many as several hundred take-off taps on each side of these resistors. In some installations it is desirable to arrange the stepping mechanism such that the contactors 18 and 38, representing N and I respectively, are actuated on the basis of every ten units dealt with, instead of every one unit. This makes it possible to do with a smaller number of contacts. Well known means are available for doing this.

The various electrical elements must be correlated but they may be correlated at different reference levels as one skilled in the art would readily recognize. For example, if the direct current source 55 is at a potential of 110 volts the resistor 10 is preferably of a total of about 10,000 ohms resistance and the resistor 11 is preferably of about 500 ohms resistance but at other potentials these resistors may have either a larger or smaller range.

To begin operation, the manually adjustable potentiometer 56 is set to yield a voltage through the meter 57 and relay 58 corresponding to the desired AOQ. The contactors 18, 28, 38 and 48 are all set at their lowest positions, these positions representing arbitrary zero values which are slightly above the points of actual zero potential in order to avoid a short circuit. Thus, Equation 1 becomes $$C = \left(\frac{A+k_1}{N+k_2}\right)\left(\frac{B+k_3}{I+k_4}\right) \quad (2)$$

This modification is advantageous from the standpoint of statistics since it automatically compensates, to some extent, for the lesser degree of certainty which is necessarily associated with small values of total population. For purposes of illustration let it be assumed that $$k_1 = k_2 = k_3 = k_4 = 1$$

Let it also be assumed that the voltage supply 55 is at a value of 100 volts, and that the potentiometer 56 is taking off a voltage of 4 volts, corresponding to a desired A.O.Q.L. of 4%. As each unit comes off the assembly line, the inspector depresses push button 23. If the signal light 63 goes on the inspector inspects the unit for defects and if he finds none he accepts the unit and presses the push button 43. If the unit is defective he rejects the unit and presses the push button 43 and also 53. This operation is repeated on subsequent units until such time as the signal light 62 operates. When this occurs the inspector does not inspect the unit, and does not press either 43 or 53, but instead pushes push button 33 along with the push button 23. The following table illustrates what happens during the first 16 inspections, all of which show the unit inspected to be satisfactory. The relay 58 has a steady potential of 4 volts at the point J, due to the 4% A.O.Q.L. setting on the first voltage divider. Current therefor flows from J to K when the potential at K is less than 4 volts; this operates the contacts 61 and the unit in question is not inspected. When the potential at K is greater than 4 volts, current flows from K to J and causes the contacts 59 to close, and the unit in question must be inspected. When the voltage at J is exactly equal to the voltage at K, the sensitive relay will make a decision anyway, in favor of one or the other set of contacts.

| Unit No. | $\left(\frac{A+1}{N+1}\right)$ | $\left(\frac{B+1}{I+1}\right)$ | Voltage at the point K | Signal Indication |
|---|---|---|---|---|
| 0 | (1/1) | (1/1) | 100 | Inspect. |
| 1 | (1/2) | (1/2) | 25 | Do. |
| 2 | (1/3) | (1/3) | 11 | Do. |
| 3 | (1/4) | (1/4) | 6 | Do. |
| 4 | (1/5) | (1/5) | 4 | Do. |
| 5 | (1/6) | (1/6) | 2.78 | Pass. |
| 6 | (2/7) | (1/6) | 4.76 | Inspect. |
| 7 | (2/8) | (1/7) | 3.57 | Pass. |
| 8 | (3/9) | (1/7) | 4.76 | Inspect. |
| 9 | (3/10) | (1/8) | 3.75 | Pass. |
| 10 | (4/11) | (1/8) | 4.54 | Inspect. |
| 11 | (4/12) | (1/9) | 3.70 | Pass |
| 12 | (5/13) | (1/9) | 4.28 | Inspect. |
| 13 | (5/14) | (1/10) | 3.57 | Pass. |
| 14 | (6/15) | (1/10) | 4.00 | Inspect. |
| 15 | (6/16) | (1/11) | 3.41 | Pass. |
| 16 | (7/17) | (1/11) | 3.74 | Do. |

If the above table were extended, it would be seen that the decision to inspect occurs less and less frequently as good units continue to pass by. The discovery of a defective unit, on the other hand, immediately increases the inspection rate, the number of units inspected out of the total number of units at any time is given by the expression:

$$I = \frac{BN + B + N + 1 - CN - C}{CN + C + B + 1}$$

When $N = 1000$, and the AOQL is 4%, this expression becomes:

$$I = \frac{(1001)B + 961}{41 + B}$$

This equation makes possible the construction of the following table:

[In units of 1,000.]

| Number Found Defective | Number Inspected | Implied Incoming Percent Defective | AOQ in Percent |
|---|---|---|---|
| B | I | B/I | $\frac{(100)(A/N)}{(B/I)}$ |
| 0 | 23 | (0) | (0) |
| 1 | 47 | 2.13 | 2.03 |
| 2 | 69 | 2.90 | 2.70 |
| 5 | 130 | 3.84 | 3.34 |
| 10 | 215 | 4.65 | 3.65 |
| 20 | 344 | 5.82 | 3.82 |
| 50 | 561 | 8.92 | 3.92 |

In the above table it may be seen how I increases with B. The AOQ remains less than 4% regardless of the size of B and varies only slightly over most of the range of likely values of B. This variation in AOQ is most noticeable at the low end of the scale and is quite desirable from the statistical point of view, since, when the sample size is small, the likelihood is greater that the percentage defective in accepted lots may exceed the calculated AOQL. The device thus automatically includes a safety factor for low inspection rates.

Fig. 3 illustrates the device of Fig. 1 applied to an actual assembly line which separates units to be inspected from units to be passed and forwards the units to be inspected to an inspector's station. Counting, except for rejects, is performed automatically. When a unit fails to pass inspection the inspector replaces it with a unit that is known to be good and presses push button 53. A plurality of units 70 pass on an assembly line in the direction from left to right as seen in Fig. 3. A photoelectric counting apparatus 71 notes the passage of each unit and actuates the push button 23. Obviously, relay contacts may be substituted in this operation for the push button 23. If the contacts 59 of the relay 58 are closed the control device 64 will actuate a fin 74 to direct the unit to an "inspect" chute 72. Here the unit will engage a push button actuating mechanism 75 pivotally mounted on a pivot 76. The actuating mechanism will engage the push button 43, which in this case is a microswitch, and this element closes its contacts to energize the stepping magnet 42 and advance the contact bar 38 one step. After the unit has passed the switch actuating mechanism 75 is returned to position against a stop 77 by the action of a spring 78.

When the unit reaches the inspector's station he checks it and if he finds the unit defective he presses the push button 53, removes the unit, and replaces it with one which is known to be satisfactory. If the unit is satisfactory the inspector allows it to proceed on the assembly line and takes no further action. The voltmeters 57 and 65 as well as the indicator lamps 62 and 63 are mounted where the inspector may check them to ascertain that the apparatus is functioning properly.

As soon as the contacts 61 of the relay 58 are closed, the directing fin 74 returns to the position indicated in solid lines and the units are diverted to the "pass" chute 73. Here they operate a push button actuating mechanism 81 similar to the mechanism 75 which engages the switch 33 which in turn energizes the stepping magnet 32 to advance the contact bar 28 one step. Other elements of the mechanism 81 include a pivot 82, return stop 83 and biasing spring 84. Obviously the mechanisms 75 and 81 are not satisfactory for all counting operations. In certain installations photoelectric counting devices such as 71 are more satisfactory.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A quality control device comprising an electrical bridge circuit having a pair of input terminals connected to be supplied from a voltage source, said bridge circuit including a first, second and third voltage divider, said first and second voltage dividers connected between said input terminals whereby said first voltage divider constitutes one bridge branch, the output voltage of said first voltage divider being variable in accordance with the output level to be maintained for outgoing units, a plurality of taps on each of said second and third voltage dividers, a first and a second stepping switch connected with the taps of said second voltage divider whereby advancing said first stepping switch increases the total resistance of said second voltage divider and advancing said second stepping switch increases the output voltages of said second voltage divider, a third and fourth stepping switch connected with the taps of said third voltage divider whereby advancing said third stepping switch increases the total resistance of said third voltage divider and advancing said fourth stepping switch increases the output of said third voltage divider, means electrically connecting said second and third stepping switches thereby to apply the output voltage from said second voltage divider to said third voltage divider whereby said second and third voltage dividers comprise the other branch of said bridge, means for advancing said first stepping switch in accordance with the number of said units inspected, means for advancing said second stepping switch in accordance with the number of units found to be defective, means for advancing said third stepping switch in accordance with the number of total units produced, means for advancing said fourth stepping switch in accordance with the total number of units accepted without inspection, and measuring means connected to receive the output of said first and third voltage dividers for measuring the direction and magnitude of imbalance of said bridge.

2. A quality control device comprising an electrical bridge circuit having a pair of input terminals connected to be supplied from a voltage source, said bridge circuit including first, second and third voltage dividers, said first and second voltage dividers connected between said input terminals, the output voltage of said first voltage divider being variable in accordance with the output level to be maintained for outgoing units, a plurality of taps on each of said second and third voltage dividers, a first and second stepping switch connected with the taps of said second voltage divider whereby advancing said first stepping switch increases the total resistance of said divider and advancing said second stepping switch increases the output voltage of said second divider, a third and fourth stepping switch connected with the taps of said third voltage divider whereby advancing said third stepping switch increases the total resistance of said third voltage divider and advancing said fourth stepping switch increases the output voltage of said third voltage divider, means electrically connecting said second and third stepping switches whereby the output voltage of said second voltage divider is applied to said third voltage divider, means for advancing said first stepping switch in accordance with the number of units inspected, means for advancing said second stepping switch in accordance with the number of said units found to be defective, means for advancing said third stepping switch in accordance with the total number of units produced, means for advancing said fourth stepping switch in accordance with the total number of units accepted without inspection, and means connected between the output of said first voltage divider and fourth stepping switch for measuring the direction and magnitude of imbalance of said bridge.

3. A quality control device comprising an electrical bridge circuit having a pair of input terminals connected to be supplied from a voltage source, said bridge circuit including first, second, and third voltage dividers, said first and second voltage dividers being connected between said input terminals, said first voltage divider having at least one variable potentiometer arm, the voltage output of said first voltage divider being variable in accordance with the quality level to be maintained for outgoing units, the second and third voltage dividers having at least two variable potentiometer arms whereby the voltage output of said second voltage divider may be varied in accordance with the ratio of the number of units found defective to the number of units inspected, and the voltage output of the third voltage divider may be varied in accordance with the ratio of the number of units passed without inspection to the total number of units produced, a variable potentiometer arm of said third voltage divider being connected to the output of said second voltage divider whereby the third voltage divider receives the output voltage from said second voltage divider and multiplies the ratio represented by its setting by the ratio represented in the output of the second voltage divider, and means connected between potentiometer arms on said first and third voltage dividers to indicate the imbalance of said bridge is determined in accordance with the voltages supplied by said three voltage dividers.

4. A quality control device comprising an electrical bridge circuit having a pair of input terminals connected to be supplied from a voltage source, said bridge circuit including first, second, and third voltage dividers, said first and second voltage dividers being connected between said input terminals whereby said first voltage divider comprises one branch of said bridge circuit, said first voltage divider having at least one variable potentiometer arm for varying the output voltage of said voltage divider in accordance with the output quality level to be maintained for outgoing units, said second voltage divider having at least two variable potentiometer arms for varying the output voltage from said second divider in accordance with the ratio of the number of units found defective to the number of units inspected, said third voltage divider having at least two variable potentiometer arms for varying the output voltage of said third voltage divider in accordance with the ratio of the number of units passed without inspection to the total number of units produced, a variable potentiometer arm of said third voltage divider being connected to the output of said second voltage divider to receive an output voltage therefrom whereby said second and third voltage dividers comprise the other branch of said bridge circuit, and indicating means connected to the variable potentiometer arms on said first and third voltage dividers to receive the output voltages therefrom to provide an indication of the imbalance of said bridge.

References Cited in the file of this patent

UNITED STATES PATENTS

| | | |
|---|---|---|
| 2,040,086 | Goodwillie | May 12, 1936 |
| 2,501,058 | Klasek | Mar. 21, 1950 |
| 2,539,758 | Silverman et al. | Jan. 30, 1951 |
| 2,557,070 | Berry | June 19, 1951 |
| 2,602,586 | Davidson | July 8, 1952 |
| 2,698,134 | Agins | Dec. 28, 1954 |
| 2,713,457 | Bubb | July 19, 1955 |

OTHER REFERENCES

Computing Circuits and Devices for Industrial Process Functions (Hornfeck), Transactions of AIEE, vol. 71, part I, July 1952, page 189.